United States Patent [19]

Doerer et al.

[11] Patent Number: 5,089,328
[45] Date of Patent: Feb. 18, 1992

[54] PANEL AND METHOD OF MAKING THE SAME

[75] Inventors: Richard P. Doerer, Grosse Pointe, Mich.; Edward J. Bihun, Huron, Ohio

[73] Assignee: Van Dresser Corporation, Troy, Mich.

[21] Appl. No.: 160,676

[22] Filed: Feb. 26, 1988

[51] Int. Cl.$^5$ .................. B32B 5/14; B32B 33/00
[52] U.S. Cl. .................. 428/308.4; 156/90; 156/285; 156/306.6; 156/306.9; 156/307.3; 156/313; 296/214; 428/247; 428/316.6; 428/317.7
[58] Field of Search .............. 156/90, 313, 306.9, 156/307.3, 285, 306.6; 428/308.4, 316.6, 317.7, 247; 296/214

[56]  References Cited

U.S. PATENT DOCUMENTS

| | | | |
|---|---|---|---|
| 3,193,440 | 7/1965 | Schafer | 156/285 |
| 3,264,166 | 8/1966 | Lowery | 428/247 |
| 3,825,642 | 7/1974 | Kies | 156/285 |
| 3,829,343 | 8/1974 | Remmert | 156/306.6 |
| 4,042,751 | 8/1977 | Roth | 428/316.6 |
| 4,119,749 | 10/1978 | Roth et al. | 428/316.6 |

Primary Examiner—John J. Gallagher
Attorney, Agent, or Firm—Barnes, Kisselle, Raisch, Choate, Whittemore & Hulbert

[57]  ABSTRACT

A method of making a lightweight panel having a relatively soft foam-backed cover sheet supported on a relatively hard, self-supporting core in one simple step. An assembly of foam layers is built up comprising a core-forming foam layer, an intermediate foam layer, and a cover-backing foam layer, with a scrim sheet over the core-forming foam layer and a cover sheet over the cover-backing foam layer. The core-forming layer is impregnated with a heat-activatable hardening compound. The intermediate layer as well as the cover-backing layer may also, if desired, be impregnated with a heat-activatable hardening compound but usually in lesser amounts. The hardening compound coats the cell walls of the foam. The panel is formed by subjecting this layered assembly to heat and pressure between contoured dies in a single compression molding operation at a temperature at which the hardening compound is activated. The layers of the assembly are bonded together either by the hardening compound or by thermoplastic films placed between layers which are melted by the heat of the molding operation and become adhesive when melted.

14 Claims, 2 Drawing Sheets

PANEL AND METHOD OF MAKING THE SAME

This invention relates generally to a method of making panels, and to the panels resulting from the method. More particularly, the panels made by the method of this invention are automotive liner panels having a relatively soft foam-backed cover sheet supported on a relatively hard, self-supporting core.

BACKGROUND AND SUMMARY OF THE INVENTION

The panels of this invention are relatively light in weight having layers of foamed plastic material rather than heavier materials such as fiberboard, particle board or hardboard, etc., for example.

In the past, lightweight panels having a relatively soft, foam-backed and/or expanded vinyl foam-in-place cover sheet on a relatively hard, self-supporting core have been made by methods requiring several steps. One such method involves providing a soft, open cell core-forming foam layer impregnated with a heat-activatable hardening solution, and a soft, open cell barrier foam layer. An assembly including both of these foam layers is built up, consisting of a thermoplastic film, the barrier foam layer, the impregnated core-forming foam layer with glass fiber rovings on both sides, a second thermoplastic film and a scrim sheet. This assembly is passed between unheated nip rolls to squeeze some of the solution from the core-forming foam layer into the barrier foam layer with the solution trapped between the two thermoplastic films. Separately, a soft, open cell foam-backed cover sheet is made by securing a foam backing to a cover sheet. Some of the methods used are a film bond, spray-on adhesive, flame laminating, or an adhesive powder coating, for example. Alternatively, a cover sheet without foam backing may be provided. Then in a final step, the cover sheet is placed over the barrier foam layer (with the thermoplastic film over the barrier foam layer still in place or not as desired) and the assembly is subjected to heat and pressure between contoured dies in a compression molding operation to produce a finished panel. During the molding operation, some of the hardening solution may (depending on whether or not the thermoplastic film is left in) transmit to the foam backing of the cover sheet. The hardening solution is activated and hardens the core-forming layer and the barrier layer and to a lesser extent the foam backing. All of the parts of the panel are secured together in the molding operation by the heat-activated catalytic solution and by the melted thermoplastic film. U.S. Pat. No. 4,451,310 generally describes portions of this method.

We have developed an improved lightweight panel having a relatively soft foam-backed cover sheet supported on a relatively hard, self-supporting core, and a method of making the panel in one simple step. An assembly of foam layers is built up comprising a core-forming foam layer, an intermediate foam layer, and a cover-backing foam layer, with a scrim sheet under the core-forming foam layer and a cover sheet over the cover-backing foam layer. Adhesive films as well as reinforcing fibers between layers may also be provided. The core-forming layer is impregnated with a heat-activatable hardening compound coating the cell walls of the foam. The intermediate layer and the cover-backing layer may also, if desired, be impregnated with a heat-activatable hardening compound but usually in lesser amounts.

The panel is formed by subjecting this layered assembly to heat and pressure between contoured dies in a single compression molding operation at a temperature at which the hardening compound is activated. The layers of the assembly are bonded together either by the hardening compound or by thermoplastic films placed between layers which are melted by the heat of the molding operation and become adhesive when melted, or both.

In the molded panel, the core or base layer becomes relatively hard and self-supporting, the cover-backing is relatively soft and compressible to the touch, and the intermediate layer is not as hard as the core-forming layer but not as soft as the cover-backing layer. The relative softness or hardness of the layers will vary depending upon the amount of hardening compound with which they are impregnated. Other factors affecting softness or hardness are the thickness, density and compression of the foam layers, and the concentration of the hardening compound. The concentration of the hardening compound may be reduced by means of a solvent.

A panel may also be formed according to this invention consisting essentially only of a foam-backed cover sheet on a preformed, self-supporting core.

These and other objects of the invention will become more apparent as the following description proceeds, especially when considered with the accompanying drawings.

DETAILED DESCRIPTION

Figure 1:
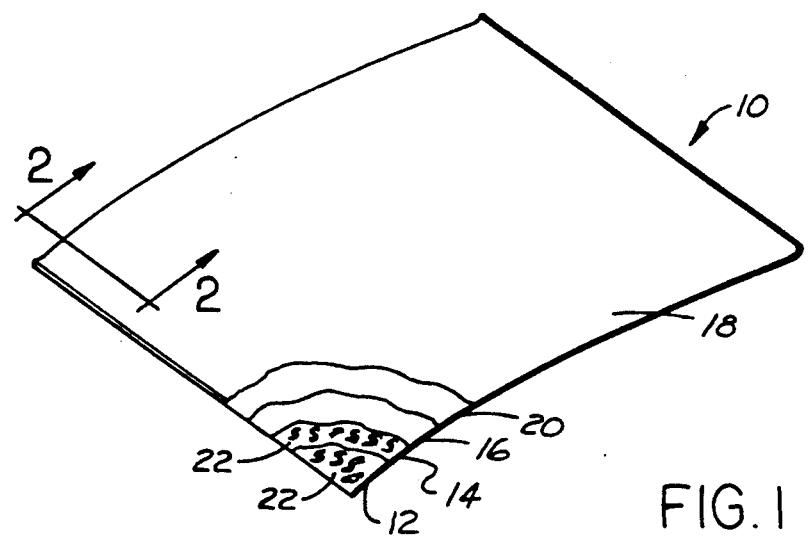
FIG. 1 is a perspective view of a panel embodying this invention and made according to the method of this invention, and with parts broken away to show the interior construction thereof.
Figure 2:
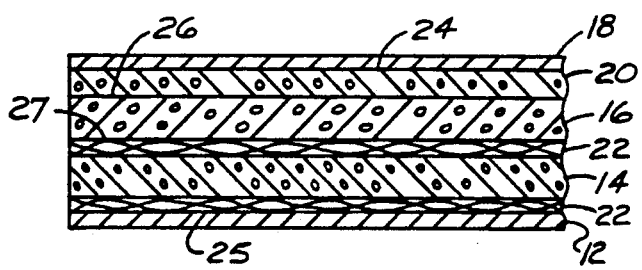
FIG. 2 is a sectional view, taken on the line 2—2 in FIG. 1.

A panel 10 embodying this invention and made according to the method of this invention is shown in FIGS. 1 and 2. Panel 10 is relatively light in weight and flexible. It comprises a flexible scrim sheet 12, a foam core layer 14, an intermediate foam layer 16, and a cover sheet 18 with a soft texture (Soft Tex) foam backing layer 20. Reinforcing fibers 22 are provided on opposite sides of the core layer 14. The fibers may be rovings or they may be in mat or sheet form. Adhesive films 24 and 25 bond the cover backing layer 20 to the cover sheet 18 and the scrim sheet 12 to core layer 14. An adhesive film 26 (optional) may be provided to bond the cover backing layer 20 to the intermediate layer 16, and an adhesive film 27 (optional) may also be provided to bond the core layer 14 to the intermediate layer 16. A hardening compound coats the walls of the cells of the foam layers, and also serves as a bonding agent between foam layers and adjacent elements making up the panel.

Figure 3:
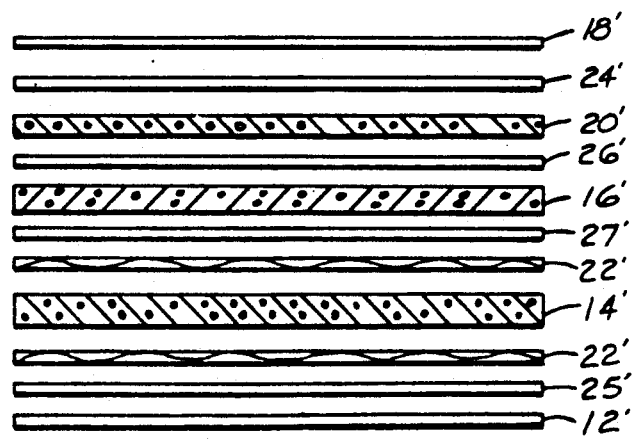
FIG. 3 is a diagrammatic view of a layered assembly of the parts of which the panel is made, prior to being placed between heated dies in a compression molding operation.

FIG. 3 shows the constituent elements which may be used to make the panel 10. Such elements are shown separated, but arranged in the same order that they bear to one another prior to molding and identified by the same references primed.

The rectangular flexible scrim sheet 12' provides a backing for the side of the panel which is concealed when installed in an automobile as a headliner, for example.

The foam layers or laminations 14', 16' and 20' may be uniform in thickness and are made from soft, flexible rectangular sheets of any suitable expanded, reticulated or open cell plastic material, such, for example, as polyether, polyolefin, polyester or urethane, or any combination thereof.

The foam layer 14', which becomes the core or base layer 14 of the panel 10, is impregnated or saturated with a heat-activatable liquid compound which enters and fills the cells of the foam, coating the cell walls. The compound under goes a chemical reaction and becomes thermoset when activated and makes the impregnated layer harder or firmer. The compound is, therefore, sometimes referred to as a hardening compound. It is a compound selected from the group comprising isocyanates and having consequently at least one —NCO group in its formula. Examples of compounds belonging to the isocyanate group are the isocyanates themselves (pure or raw) such as TDI (toluene diisocyante) or MDI (4-4'- diphenylmethane di-isocyate), the polymers of isocyanates containing at least one terminal —NCO group, and generally, any compound having at least one —NCO termination in its molecule.

The more hardening compound used to impregnate the layer 14', the harder and stiffer will be the core or base layer of the molded panel after the compound is activated. The amount of hardening compound with which the layer 14' is impregnated will vary widely depending upon the hardness desired, although enough is required to provide the necessary self-supporting, form-retaining character of the core or base layer 14 so that the panel will hold its shape yet be flexible. Just as an example, and without any intent to limit the invention, for a foam layer 14' of open cell polyether -urethane having a density of 1.1 pounds per cubic foot and a thickness of 7 millimeters, impregnating the layer with 400 grams of MDI per square meter of surface area would normally be sufficient to provide a core layer capable of holding its shape. Increasing the amount of MDI would correspondingly increase hardness and stiffness. As already noted, other factors affecting softness or hardness are the thickness, density and compression of the foam layers, and the concentration of the hardening compound. To reduce the concentration of the hardening compound, it may, if desired, be mixed with a suitable solvent such as trichloroethylene.

The foam layer 16', which becomes the intermediate layer 16 of the panel 10, may also be impregnated with the hardening compound. However, it is desired that the intermediate layer 16 of the panel be not as hard as the core layer 14 and not as soft as the cover-backing layer 20, serving as a transition or absorber layer. Therefore, assuming an intermediate layer 16' of the same material and having the same density and dimensions as the core foam layer 14' previously described, it would be impregnated with less liquid MDI hardening compound than the layer 14'.

The foam layer 20', which becomes the cover-backing layer 20 of the finished panel 10, may also be impregnated with the hardening compound. However, it is desired that the cover-backing layer 20 of the panel 10 be softer than the intermediate lay 16, so that the cover sheet 18 will be soft to the touch. Therefore, assuming a cover-backing layer 20' of the same material and having the same dimensions (although possibly somewhat thinner or thicker) as the intermediate layer 16' previously described, it would be impregnated with less liquid MDI hardening compound than layer 16'.

Figure 5:
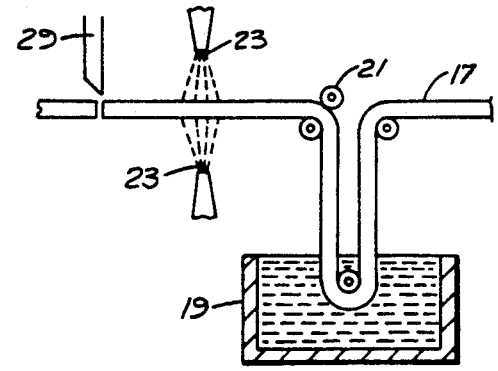
FIG. 5 is a diagrammatic view illustrating the impregnation of a panel.

The impregnated foam layers may be treated with an accelerator, such for example as water or an amine, to reduce the reaction time of the hardening compound, and correspondingly reduce the time required to form the panel in the press. These accelerators also increase the hardness of the impregnated panel. Water and amine accelerators also tend to make the impregnated layer somewhat brittle and, therefore, should not be used in the cover-backing foam layer 20'. Polyols are much more flexible accelerators than water or amine, and are recommended. Polyols also increase hardness, and in addition enhance the strength and integrity of the impregnated product. Examples of suitable polyols are
(a) 1,4 butanediol
(b) trimethylol propane
(c) ethylene glycol FIG. 5 shows diagrammatically one way in which the foam may be impregnated. As there shown, a strip 17 of foam material is impregnated with hardening compound by being immersed in and drawn through a bath 19 of the hardening compound. Nip rolls 21 which draw the foam through the bath are set to squeeze a certain amount of the hardening compound out of the foam, depending upon the degree of foam hardening or stiffening desired. An accelerator may be sprayed on the impregnated panel as indicated at 23. Any suitable means, such as knife 29, may be provided to cut the impregnated foam into layers 14', 16' and 20'.

A foam layer may be impregnated with so much of the hardening compound that after the compound is activated the foam layer will be virtually rigid, with little, if any, softness or yieldability.

On the other hand, a foam layer, such as the cover backing layer 20, may be impregnated with much less hardening compound so that it will still be quite soft to the touch after the compound is activated. Moreover, if compressed to a state of reduced thickness during activation of the compound, the foam layer will in effect take a new set because the compound coating the cell walls of the foam has an adhesive character so as to yieldably retain the foam in the state of reduced thickness even after the compression is removed. The resulting foam layer, although of reduced thickness, will still be soft to the touch.

The films 24'-27' are flexible rectangular thermoplastic sheets, preferably of polyethylene, each having approximately the same length and width, or greater, as the core-forming, intermediate, and cover-backing foam layers 14', 16' and 20'. These films when heated to melting become adhesive.

The cover sheet 18' is a flexible facing sheet of a material suitable for covering the exposed side of the panel when installed. The cover sheet may be vinyl, ABS (acrylonitrile butadiene-styrene), cloth (woven or non-woven), or any other suitable facing material.

The reinforcing fibers 22' on opposite sides of the core-forming layer 14' are preferably glass fibers in the form of rovings or in mat or sheet form. Other synthetic fibers, such as polyester, may be used. Fiber diameter (Denier) can vary.

These elements, arranged in the order shown in FIG. 3, are placed in a press or mold between heated dies 40 and 42 in a single compression molding operation to form the panel 10 in FIG. 1. The dies may be contoured to produce a panel having areas of varying thickness and density. Both temperature and time may vary, but should be sufficient to activate the hardening compound and cause the foam layers to take a set, and to melt the thermoplastic films. As previously stated, the forming time cycle may be reduced if, prior to placing the assembly of elements in the press, an accelerator, preferably a polyol, is applied to the impregnated foam layers. The accelerator shortens the reaction time of the hardening compound and also increases hardness.

Figure 4:
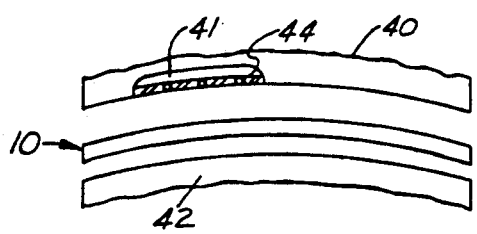
FIG. 4 is a diagrammatic view, partly in section, showing an open press which may be used in carrying out the compression molding operation, with a molded panel shown in dotted lines between the mold parts of the open press.

The die 40 preferably has a vacuum chamber. Vacuum in the chamber is applied through small openings 44 in the face of the die opposite the cover sheet (See FIG. 4). The cover sheet 18' is sucked up against the face of die 40 by vacuum when the dies are closed, to eliminate excessive compression of the Soft Tex foam backing layer 20' during the forming cycle. The designed softness of the foam backing layer 20' (with extra softness where desired) can be engineered into the press dies without any pressure from the cover sheet.

Prior to entering the press, the thermoplastic films have considerable strength and facilitate handling the assembly of elements. They also serve as barriers, preventing migration of the hardening solution, so that the cover sheet and scrim sheet are untouched by the solution, and the solution in any one foam layer is kept separated from the solution in the other foam layers. After melting in the press, the thermoplastic films may or may not retain their barrier function depending on the time and temperature of the molding operation. When these thermoplastic films are not used, the area between the layers is sufficiently barrier free to permit migration of the hardening compound.

In the press, the thermoplastic films melt and become adhesive, coating the surfaces of the adjacent elements of the panel being formed and adhering them together.

The solution impregnating the foamed layers becomes activated by the heat of the press, the reaction producing a derivative of urethane, urea and biuret. Any solvent that may have been mixed with the hardening compound is driven off in the reaction leaving the cell walls of the foam layers with a hardened coating, the degree of hardness depending on the amount of the impregnating compound. The hardening compound also serves as an adhesive between layers in the finished panel, bonding the foam layers to the adjacent elements of the panel.

The resulting panel is shown in FIGS. 1 and 2. It is flexible and relatively light in weight, having a relatively hard or stiff, self-supporting core or substrate, a cover sheet which is soft to the touch because of the relatively soft cover-backing foam layer, and an intermediate layer which will be of intermediate hardness. Some areas of the cover-backing foam layer may be compressed more than other areas, depending on the contour of the press dies. The compressed cover-backing foam layer will take a new set, that is, will retain its compressed condition, or state of reduced thickness, even after coming out of the press, due to the adhesive nature of the activated compound coating the cell walls of the foam, yet still be soft to the touch. The intermediate layer and core layer will likewise remain in their compressed condition, although the core layer will have little, if any, softness.

The foam layers can be altered in different ways to achieve different specifications. As one example, by increasing the saturant level, that is, the amount of hardening compound in the foam, density and firmness can be increased. Increasing foam thickness will improve its acoustical qualities and, if compressed, will increase dampening, density and hardness. There are many combinations of foam thickness, density and saturation levels that can be used to engineer the desired results. With these production aids, multiple densities throughout the product are attainable. For example, specific areas of a part can be densified for attachment purposes while other areas of the same part can have a high soft loft for better appearance and improved acoustical characteristics.

Extremely difficult three dimensional parts can be formed with ease by the method of this invention. Areas of strength and/or softness can be pre-engineered and designed into the part by means of foam densification in planned or selected areas and the use of the above-mentioned options. Each layer can have the same basic foam density initially, cut to the same or different thickness, or one or all layers can have a different base density. There can be a different cellular structure per layer; for example, one layer may have more open cells or another layer may have more closed cells, depending on the desired end result. The method is highly flexible, making it possible to formulate parts having a wide variety of different specifications, including accoustics, strengths, sound dampening, and esthetics such as soft touch, etc.

The thermoplastic films between foam layers provide barriers which prevent migration of the hardening compound from one foam layer to the next, thus maintaining the saturant levels within each foam layer and isolating the layers from one another and stratifying regions of hardness. The thermoplastic film 24 plays an especially important role as a barrier when a cover sheet of porous material is used, because the vacuum applied to a porous cover sheet would not be as effective in drawing the cover sheet against the face of the die if the thermoplastic film were not present.

The thermoplastic film also acts as a slip sheet, allowing the foam to flow and expand in a most relaxed, free condition filling the desired openings and recesses of the press. This is especially true when using non-porous cover materials such as vinyl, expanded vinyl, etc. All films play an important role as a slip sheet agent, allowing each layer to conform uniformly to the three-dimensional shape being formed. Films can differ in mil thickness and porosity. Sometimes only partial films, that is films of lesser width and/or length than the other layers, are used. Sometimes, films are omitted altogether.

The end products of this invention can be made without the use of accelerators, moisture, fiber reinforcement or thermoplastic film, also each of these elements serves a function in making a better product.

If the thermoplastic film between layers 14' and 16' is omitted, then there will be a migration of the liquid hardening compound between these layers before and during compression in the mold. As a result, there will be a gradual transition in hardness from one of these layers to the other. If, prior to molding, the intermediate layer 16' is not impregnated at all with hardening compound, it would still, in the absence of an intervening thermoplastic film, receive some hardening compound from the layer 14', at least at the interface.

If the thermoplastic film between layers 16' and 20' is omitted, then there will be a migration of the liquid hardening compound between these layers before and during compression in the mold. As a result, there will be a gradual transition in hardness or softness from one of these layers to the other. If, prior to molding, the cover-backing layer 20' is not impregnated at all with liquid hardening compound, it would still, in the absence of an intervening thermoplastic film, receive some hardening compound from the layer 16' at least at the interface.

EXAMPLE

The following is given for the purposes of illustration, not limitation, as one example for carrying out the process of this invention:

foam layers 14' and 16' formed of flexible, soft, rectangular sheets of open cell polyether-urethane having a density of 1.1 pounds per cubic foot and a thickness of 7 millimeters;

foam layer 20' formed of the same rectangular dimensions, structure and material as layers 14' and 16', but with a thickness of 9 millimeters;

films 24'-27' formed of flexible sheets of polyethylene having the same rectangular dimensions as the foam layers and a thickness of 1 millimeter;

cover sheet 18' formed of a rectangular sheet of nonwoven cloth;

scrim sheet 12' formed of a rectangular sheet of common scrim sheet material;

fibers 22' formed of glass fiber rovings approximately 2 centimeters in length;

hardening compound is MDI (4-4'—diphenylmethane di-isocyanate) in pure liquid form without solvent;

foam layer 14' is impregnated with the isocyanate hardening compound in an amount equal to 500 grams per square meter of surface area of the foam layer;

foam layer 16' is impregnated with the isocyanate hardening compound in an amount equal to 250 grams per square meter;

foam layer 20' is impregnated with 50 grams per square meter of the hardening compound.

These constituent elements are assembled in the order shown in FIG. 3 and placed in a press between heated dies in a single compression molding operation. The dies are contoured to produce a panel having varying thickness and density. Temperature of the dies is 300° F. Complete molding time is 60 seconds.

Figure 6:
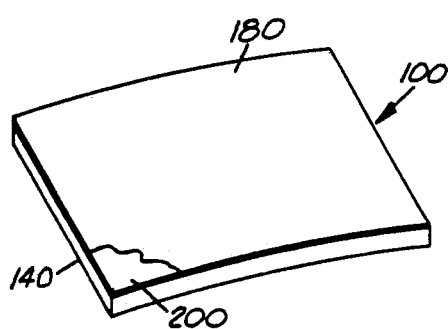
FIG. 6 is a perspective view of a modified panel made according to the method of this invention.

FIG. 6 shows a modified panel made according to the method of this invention. The panel 100 comprises a flexible cover sheet 180, a relatively soft flexible cover-backing foam layer 200, and a relatively rigid or at least self-supporting core or substrate 140.

Figure 7:
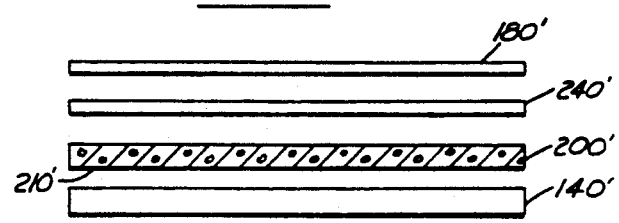
FIG. 7 is a diagrammatic view of a layered assembly of the parts making up the panel of FIG. 6, prior to being placed between heated dies in a compression molding operation.

FIG. 7 shows the elements 180, 200 and 140 separated but in the same order that they bear to one another prior to molding and identified by the same references primed.

The cover sheet 180' may be exactly like the cover sheet 18' previously described, made to the specifications of the foregoing example.

The cover-backing foam layer 200' may be exactly like the cover-backing foam layer 20' previously described, made to the specifications of the foregoing example.

The core or substrate 140' is a preformed member which may be made of any suitable material such for example as a mixture of wood fibers and synthetic fibers molded according to the method described in Doerer, et al U.S. Pat. No. 4,474,846.

The foam layer 200' is impregnated or saturated with a heat activatable liquid compound which may be exactly like the compound used to impregnate the foam layers 14', 16', and 20' previously described and made to the specifications of the foregoing example.

Prior to being placed in the press, a thermoplastic film 240', which may be exactly like the thermoplastic film 24' previously described and made to the specifications of the foregoing example, is positioned between the cover sheet 180' and the foam layer 200'. Also, a suitable contact-type spray-on adhesive 210' is applied to the surface of the foam layer 200' opposed to the substrate, or alternatively it may be applied to the surface of the substrate 140' which is opposed to the foam layer 200'. As a further alternative, a thermoplastic film, like the film 240', may be placed between the foam layer 200' and the substrate 140'. Use of thermoplastic film between foam layer 200' and substrate 140' is not recommended, however, because it impedes the transmission of the heat of the die to the foam layer. The purpose of the thermoplastic film or films and the spray-on adhesive is to adhere together the contacting layers in the finished panel.

Thereafter, the assembly of components as seen in FIG. 7 is placed in a press and formed under heat and pressure in a compression molding operation similar to that previously described in connection with the first embodiment. The dies of the press do not materially affect the thickness or configuration of the substrate, which is substantially rigid, but are preferably contoured to compress the foam layer varying degrees, depending on the ultimate panel thickness, density and configuration desired. The compression molding operation is conducted at a temperature and for a time sufficient to activate the hardening compound and cause the foam layer to take a permanent set, and to melt the thermoplastic film or films and also activate the contact adhesive. The adhesive nature of the melted thermoplastic film or films and of the contact adhesive serves to securely bond together the cover sheet 180, foam layer 200 and substrate 140. Time and temperature may be in accordance with the previous example.

When activated, the compound will form an adhesive film on the cell walls of the foam layer. The foam layer, at least in those areas which are compressed in the mold to a state of reduced thickness, will be yieldably retained in that state of reduced thickness by the hardening compound so that the foam layer, although of reduced thickness when it leaves the press, will still be soft to the touch.

In the manufacture of this panel, a polyol accelerator may be employed. However, water and/or amine as an accelerator should not be used because of its tendency to make the panel somewhat brittle. The resulting panel will be soft to the touch, particularly in those areas which are not greatly compressed, and in those areas in which a greater degree of compression is applied, the foam will still be somewhat soft to the touch but a bit firmer.

Figure 8:
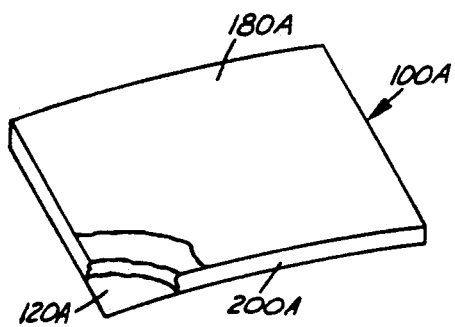
FIG. 8 is a perspective view of another modified panel made according to the method of this invention.

FIG. 8 shows another modified panel made according to the method of this invention. The panel 100A comprises a flexible cover sheet 180A, a relatively soft flexible cover-backing foam layer 200A, and a flexible scrim sheet 120A.

Figure 9:
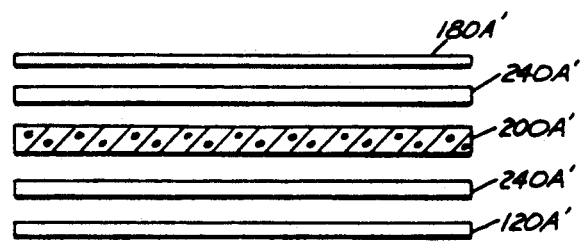
FIG. 9 is a diagrammatic view of a layered assembly of the parts making up the panel of FIG. 8, prior to being placed between heated dies in a compression molding operation.

FIG. 9 shows the elements 180A, 200A and 120A separated but in the same order they bear to one another prior to molding and identified by the same references primed.

The cover sheet 180A' may be exactly like the cover sheet 18' previously described, made to the specifications of the foregoing example.

The cover-backing foam layer 200A' may be exactly like the cover-backing foam layers 20' previously described, made to the specifications of the forgoing example.

The scrim sheet 120A' may be exactly like the scrim sheet 12' previously described, made to the specification of the foregoing example.

The cover-backing foam layer 200A' is impregnated or saturated with a heat-activatable compound which may be exactly like the compound used to impregnate the foam layers 14', 16' and 20' previously described and made to the specifications of the foregoing example.

Prior to being placed in the press, a thermoplastic film 240A', which may be exactly like the thermoplastic film 24' previously described and made to the specifications of the foregoing example, is positioned between the cover sheet 180A' and the foam layer 200A'. A second thermoplastic film, which may be exactly like the thermoplastic film 240A', is positioned between the scrim sheet 120A' and the foam layer 200A'.

Thereafter, the assembly of components as seen in FIG. 9 is placed in a press and formed under heat and pressure in a compression molding operation similar to that previously described in connection with the first two embodiments. The dies of the press may be contoured to compress the foam layer in varying degrees, depending on the ultimate panel thickness, density and configuration desired. The compression molding operation is conducted at a temperature and for a time sufficient to activate the hardening compound and cause the foam layer to take a permanent set, and to melt the thermoplastic films. The melted thermoplastic films serve to securely bond together the cover sheet 180A, foam layer 200A and scrim sheet 120A. Time and temperature in the press may be in accordance with the previous example.

As in the previous embodiment, the compound, when activated, will form an adhesive film on the cell walls of the foam layer. The foam layer, at least in those areas which are compressed in the mold to a state of reduced thickness, will be yieldably retained in that state of reduced thickness by the hardening compound so that the foam layer, although of reduced thickness when it leaves the press, will still be soft to the touch.

A polyol accelerator may be employed in the manufacture of the panel 100A. However, water and/or amine as an accelerator should not be used because of the tendency to make the panel somewhat brittle. The resulting panel will be soft to the touch similarly to the previous described panels, even in the areas where compressed.

Described and illustrated herein are specific examples of the method and panel of this invention. Other modes of applying the principles of the invention may be employed, provided the features of the appended claims, or the equivalent thereof, be employed.

We claim:

1. A method of making a lightweight panel such as an automotive liner panel having a cover sheet attached to a self-supporting core, comprising the steps of providing a plurality of components including a core-forming foam layer, a second foam layer, and a cover sheet, impregnating said core-forming layer with a compound which sets when activated to stiffen the impregnated layer, arranging said components into an assembly with said second layer over said core-forming layer, and said cover sheet over said second layer, and activating said compound and bonding said assembly together under heat and pressure in a compression molding operation at a temperature at which activation of said compound is accelerated and said core-forming layer is rendered self-supporting and less compressible than said second layer, said second layer and said core-forming layer being arranged in interfacial relation, whereby said compound migrates across the interface between said layers, producing after activation a gradual transition in hardness from one said layer to the other of the bonded assembly.

2. The method as defined in claim 1, wherein said foam layers are of reticulated or open cell type and said compound is an isocyanate compound having at least —NCO group.

3. The method as defined in claim 1, wherein said plurality of components includes a third foam layer between said second layer and said cover sheet, said second layer and said third layer are arranged in interfacial relation, at least one of said second and third layers is impregnated with said compound, and said compound migrates across the interface between said second and third layers, producing after activation a gradual transition in hardness from said second layer to said third layer of the bonded assembly.

4. The method as defined in claim 3, wherein said foam layers are of reticulated or open cell type and said compound is an isocyanate compound having at least one —NCO group.

5. A method of making a lightweight panel such as an automotive liner panel having a cover sheet attached to a self-supporting core, comprising the steps of providing a plurality of components including a core-forming foam layer, a second foam layer, and a cover sheet, impregnating said core-forming layer with a compound which sets when activated to stiffen the impregnated layer, arranging said components into an assembly with said second layer over said core-forming layer, and said cover sheet over said second layer, and activating said compound and bonding said assembly together under heat and pressure in a compression molding operation at a temperature at which activation of said compound is accelerated and said core-forming layer is rendered self-supporting and less compressible than said second layer, said plurality of components including a thermoplastic film between said layers which during compression molding becomes adhesive to form a bond between said layers, said film prior to becoming adhesive serving as a barrier isolating said layers from each other and preventing migration of said compound from one said layer to the other, said film after becoming adhesive ceasing to serve as a barrier whereby said compound migrates across the interface between said layers, producing after activation a gradual transition in hardness from one said layer to the other of the bonded assembly.

6. The method as defined in claim 5, wherein said foam layers are of reticulated or open cell type and said compound is an isocyanate compound having at least one —NCO group.

7. The method as defined in claim 5, wherein said plurality of components includes a third foam layer between said second layer and said cover sheet and a thermoplastic film between said second and third layers which during compression molding becomes adhesive to form a bond between said second and third layers, said second and third layers are impregnated with said compound, said last-mentioned film prior to becoming adhesive serving as a barrier isolating said second and third layers from one another and preventing migration of said compound from one of said second and third layers to the other.

8. The method as defined in claim 7, wherein said foam layers are of reticulated or open cell type and said compound is an isocyanate compound having at least one —NCO group.

9. The method as defined in claim 5, wherein said second layer is impregnated with said compound before said components are arranged into an assembly as aforesaid.

10. A method of making a lightweight panel such as an automotive liner panel having a cover sheet attached to a self-supporting core, comprising the steps of providing a plurality of components including a core-forming foam layer, a second foam layer, and a cover sheet, impregnating said core-forming layer with a compound which sets when activated to stiffen the impregnated layer, arranging said components into an assembly with said second layer over said core-forming layer, and said cover sheet over said second layer, and activating said compound and bonding said assembly together under heat and pressure in a compression molding operation at a temperature at which activation of said compound is accelerated and said core-forming layer is rendered self-supporting and less compressible than said second layer, the area between said second layer and said core-forming layer being sufficiently barrier-free to permit said compound to migrate between said layers producing after activation a gradual transition in hardness from one said layer to the other of the bonded assembly.

11. The method as defined in claim 10, wherein reinforcing fibers are provided between said second and core-forming layers.

12. The method as defined in claim 10, wherein said plurality of components includes a third foam layer between said second layer and said cover sheet, one of said second and third layers is impregnated with said compound, and the area between said second and third layers is sufficiently barrier-free to permit said compound to migrate between said second and third layers producing after activation a gradual transition in hardness from said second layer to said third layer of the bonded assembly.

13. The method as defined in claim 12, wherein reinforcing fibers are provided between said second and third layers.

14. A panel constructed according to the method of any one of claims 1, 2–8 or 9–13.

* * * * *